United States Patent
Xu et al.

(10) Patent No.: US 10,656,769 B2
(45) Date of Patent: May 19, 2020

(54) TOUCH DISPLAY DEVICE AND METHOD FOR FORMING THE SAME

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Jiawei Xu, Beijing (CN); Baoran Li, Beijing (CN); Bisheng Li, Beijing (CN); Lei Zhang, Beijing (CN); Tsungchieh Kuo, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 15/570,320

(22) PCT Filed: May 18, 2017

(86) PCT No.: PCT/CN2017/084836
§ 371 (c)(1),
(2) Date: Oct. 27, 2017

(87) PCT Pub. No.: WO2017/219802
PCT Pub. Date: Dec. 28, 2017

(65) Prior Publication Data
US 2018/0232076 A1      Aug. 16, 2018

(30) Foreign Application Priority Data
Jun. 24, 2016    (CN) .......................... 2016 1 0475030

(51) Int. Cl.
G06F 3/044       (2006.01)
G06F 3/041       (2006.01)
G02B 5/20        (2006.01)

(52) U.S. Cl.
CPC ............ G06F 3/044 (2013.01); G06F 3/0412 (2013.01); G06F 3/0414 (2013.01); *G02B 5/20* (2013.01); *G06F 2203/04105* (2013.01)

(58) Field of Classification Search
CPC ...... G06F 3/044; G06F 3/0412; G06F 3/0416; G02B 5/20
(Continued)

(56) References Cited

U.S. PATENT DOCUMENTS

2008/0174852 A1    7/2008   Hirai et al.
2014/0008203 A1*   1/2014   Nathan ................ H03K 17/962
                                                      200/600
(Continued)

FOREIGN PATENT DOCUMENTS

CN        104407758 A      3/2015
CN        205015863 U      2/2016
(Continued)

OTHER PUBLICATIONS

International Search Report & Written Opinion, for PCT Patent Application No. PCT/CN2017/084836, dated Jul. 24, 2017, 18 pages.
(Continued)

*Primary Examiner* — Calvin C Ma
(74) *Attorney, Agent, or Firm* — Kinney & Lange, P.A.

(57) ABSTRACT

A touch display device and a method for forming the same are provided. The touch display device includes a touch panel and a display panel arranged opposite to the touch panel to form a cell, where a deformable layer is arranged between the touch panel and the display panel and config-
(Continued)

ured to be deformed in response to a pressure applied to the touch panel; a plurality of first electrodes is arranged at a side of the touch panel adjacent to the display panel; a plurality of second electrodes is arranged at a side of the display panel adjacent to the touch panel; the first electrodes and the second electrodes are arranged in a one-to-one correspondence manner, and each second electrode and the corresponding first electrode form a pressure sensing capacitor; where the touch display device further includes a pressure sensing module configured to detect a capacitance change of the pressure sensing capacitor and determine a value of the pressure applied to the touch panel based on the capacitance change.

10 Claims, 3 Drawing Sheets

(58) Field of Classification Search
USPC .................................................. 345/173, 174
See application file for complete search history.

(56) References Cited

U.S. PATENT DOCUMENTS

| 2016/0085336 | A1* | 3/2016 | Kim | G06F 1/1643 |
| | | | | 345/174 |
| 2016/0162070 | A1 | 6/2016 | He et al. | |
| 2017/0101560 | A1* | 4/2017 | Mitsui | C09J 109/00 |
| 2017/0255303 | A1* | 9/2017 | Huang | G06F 3/047 |

FOREIGN PATENT DOCUMENTS

| CN | 105426007 A | 3/2016 |
| CN | 205068343 U | 3/2016 |
| CN | 105892782 A | 8/2016 |

OTHER PUBLICATIONS

First Chinese Office Action, for Chinese Patent Application No. 201610475030.7, dated Feb. 8, 2018, 12 pages.

* cited by examiner

TOUCH DISPLAY DEVICE AND METHOD FOR FORMING THE SAME

CROSS-REFERENCE TO RELATED APPLICATION

This application is the U.S. national phase of PCT Application PCT/CN2017/084836 filed on May 18, 2017, which claims a priority to Chinese Patent Application No. 201610475030.7 filed on Jun. 24, 2016, the disclosures of which are incorporated in their entirety by reference herein.

TECHNICAL FIELD

The present disclosure relates to the field of display technology, and in particular to a touch display device and a method for forming the same.

BACKGROUND

At present, the most widely used touch screen is the capacitive touch screen, in which two pressure electrodes opposite to each other are arranged on an array substrate. According to the parallel rod capacitor principle, when a pressure is applied to the capacitive touch screen, the distance between the two pressure electrodes may change, so a pressing operation to the screen may be determined based on the change of the capacitance parameter.

However, in the related art, other signal lines may be arranged on the array substrate, so a sensing accuracy may be adversely affected by the signals. In addition, in term of the forming process, a base material layer of the pressure electrodes may be formed on the array substrate at first. Since the base material layer is commonly made of plastics, a transmittance of the screen may be reduced. For certain large-size screens, the pressure electrodes formed on the plastic base material may be deformed readily, therefore it is difficult to achieve a pressure sensing.

In view of this, a pressure identification solution is required to solve the above technical issues.

SUMMARY

An objective of the present disclosure is to solve the technical issue in the related art that the pressure sensing electrodes of the touch display device may be interfered by the signals and the transmittance may be reduced.

To achieve the above objective, in one aspect, a touch display device is provided, including a touch panel and a display panel arranged opposite to the touch panel to form a cell, where a deformable layer is arranged between the touch panel and the display panel and configured to be deformed in response to a pressure applied to the touch panel; a plurality of first electrodes is arranged at a side of the touch panel adjacent to the display panel; a plurality of second electrodes is arranged at a side of the display panel adjacent to the touch panel; the first electrodes and the second electrodes are arranged in a one-to-one correspondence manner, and each second electrode and the corresponding first electrode form a pressure sensing capacitor; where the touch display device further includes a pressure sensing module configured to detect a capacitance change of the pressure sensing capacitor and determine a value of the pressure applied to the touch panel based on the capacitance change.

Optionally, an orthogonal projection of each first electrode onto the display panel overlaps an orthogonal projection of the corresponding second electrode onto the display panel.

Optionally, the deformable layer is made of an insulative adhesive, and the touch panel is adhered to the display panel through the insulative adhesive.

Optionally, the insulative adhesive is a solid-state optically clear adhesive (OCA) or an oligomer curable resin (OCR).

Optionally, the display panel includes a color filter substrate and an array substrate; and the second electrodes are arranged at a side of the color filter substrate away from the array substrate.

Optionally, a color filter sheet is arranged on the color filter substrate and covers the second electrodes.

Optionally, the touch panel further includes: a base substrate; touch electrodes arranged on the base substrate; an insulation layer covering the touch electrodes; and the first electrodes on the insulation layer.

Optionally, the second electrodes are in direct contact with a surface of the color filter substrate away from the array substrate.

Optionally, the first electrodes are uniformly arranged on a surface of the touch panel opposite to the display panel in an array form; and the second electrodes are uniformly arranged on a surface of the display panel opposite to the touch panel in an array form.

In another aspect, a method for forming a touch display device is provided, including: forming a touch panel and a display panel, where first electrodes are arranged at a side of the touch panel, and second electrodes are arranged at a side of the display panel, where the method further includes: adhering the touch panel to the display panel through an insulative adhesive to form a cell, where the side of the touch panel where the first electrodes are arranged is adjacent to the side of the display panel where the second electrodes are arranged.

Optionally, the adhering the touch panel to the display panel through the insulative adhesive to form the cell includes: coating the insulative adhesive at the side of the touch panel where the first electrodes are arranged or the side of the display panel where the second electrodes are arranged; and adhering through the insulative adhesive a portion of the touch panel at the side of the touch panel where the first electrodes are arranged to a portion of the display panel at the side of the display panel where the second electrodes are arranged, to form the cell.

Optionally, the adhering the touch panel to the display panel through the insulative adhesive to form the cell further includes: processing the insulative adhesive through a vacuum defoamation process and/or a partially-curing process, subsequent to coating the insulative adhesive.

According to touch display device of the present disclosure, the pressure electrodes are formed between the touch panel and the display panel, thereby avoiding the signal interference of the touch panel and the display panel. In addition, the pressure electrodes are within the cell, so an overall thickness of the touch display device may not be increased, which meets a development tendency of the ultrathin display device. In addition, the pressure electrodes at the side of the display panel may be directly formed on the glass substrate at the outermost side of the display panel, without arranging the plastic base material as in the related art, therefore the touch display device may have a larger transmittance and a forming process thereof may be simpler. In addition, because the strength of the glass substrate is larger than the plastic base material, the present disclosure may be particularly suitable for the touch display device having a large-size screen.

DRAWING REFERENCE

1—touch panel, 11—base substrate, 12—touch electrode, 13—insulation layer, 2—display panel, 21—color filter substrate, 22—array substrate, 23—color filter sheet, 3—first electrode, 4—second electrode, 5—deformable layer, 6—pressure detection module

DETAILED DESCRIPTION

In order to make the objects, the technical solutions and the advantages of the present disclosure more apparent, the present disclosure will be described hereinafter in a clear manner in conjunction with the drawings and embodiments.

In order to solve the technical issue in the related art that the pressure sensing electrodes of the touch display device may be interfered by the signals and the transmittance may be reduced, a solution is provided in the present disclosure.

Figure 1:
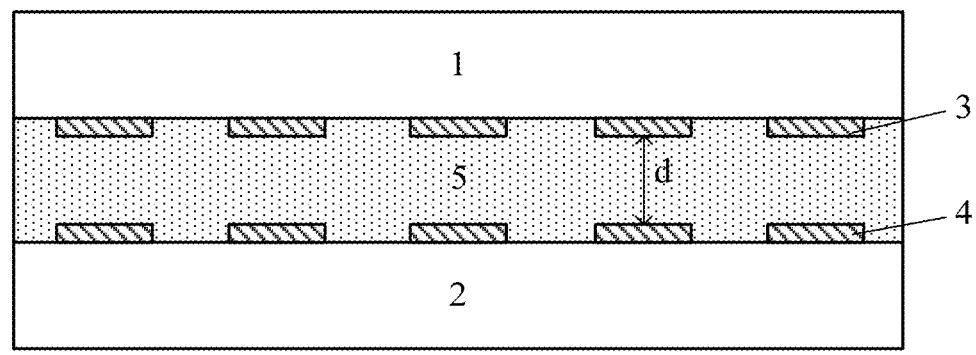
FIG. 1 is a schematic view of a touch display device in some embodiments of the present disclosure.
Figure 4:
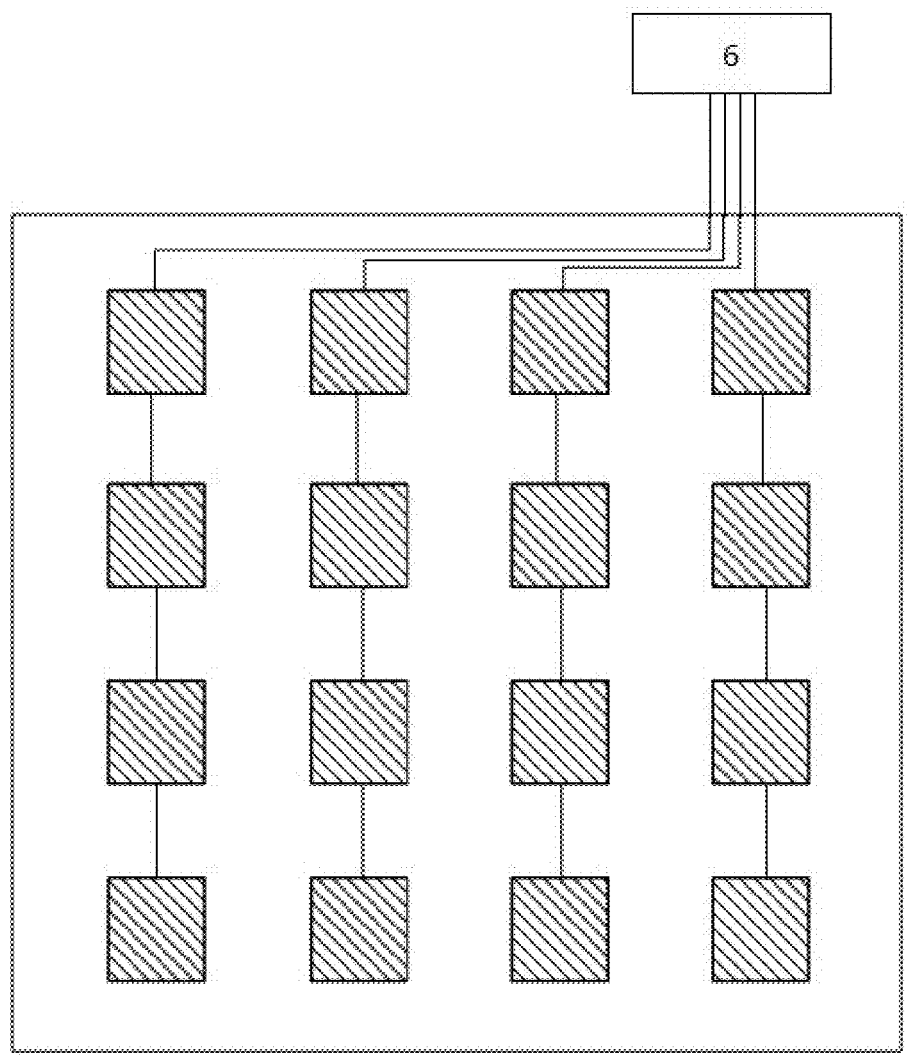
FIG. 4 is a schematic view showing a connection between a pressure detection module and first and second electrodes of a touch display device in some embodiments of the present disclosure.

In one aspect, as shown in FIG. 1, a touch display device is provided in some embodiments of the present disclosure, including a touch panel 1, a display panel 2 arranged opposite to the touch panel to form a cell, and a pressure detection module 6. In some embodiments of the present disclosure, the pressure detection module 6 may be arranged as shown in FIG. 4.

A plurality of first electrodes 3 is arranged at a side of the touch panel 1 adjacent to the display panel 2, and a plurality of second electrodes 4 is arranged at a side of the display panel 2 adjacent to the touch panel 1.

Figure 2:
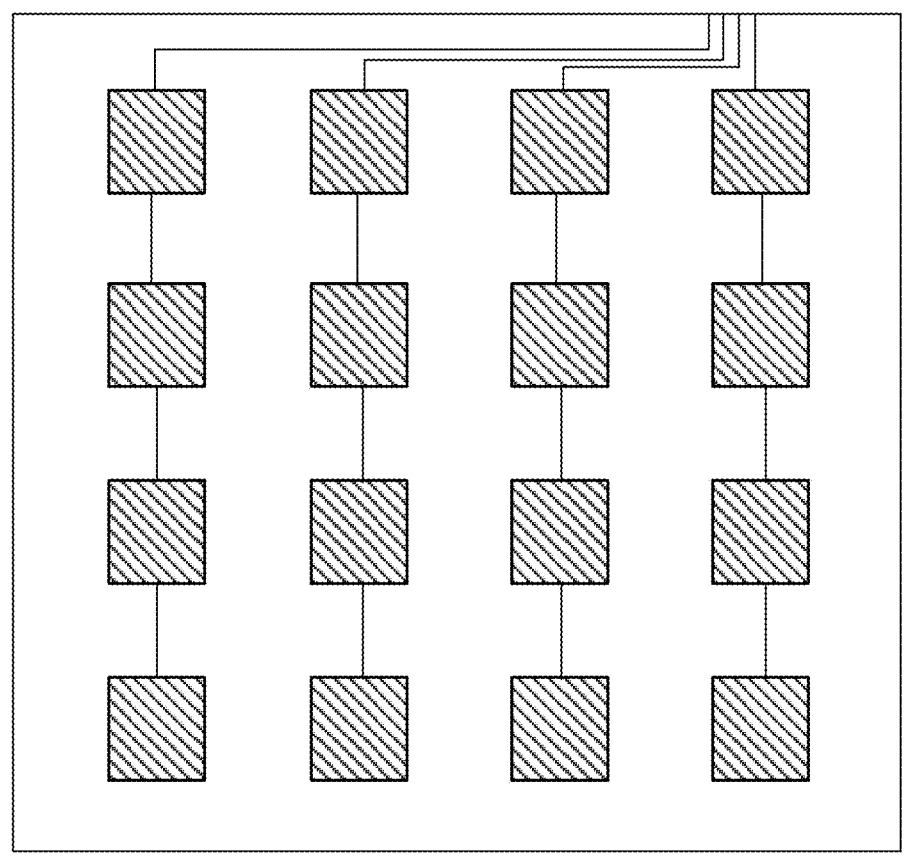
FIG. 2 is a schematic view showing a distribution of first and second electrodes of a touch display device in some embodiments of the present disclosure.

The first electrodes 3 and the second electrodes 4 are arranged in a one-to-one correspondence manner, and each second electrode 4 and the corresponding first electrode 3 form a pressure sensing capacitor. In a practical application, each second electrode 4 faces the corresponding first electrode 3, that is, an orthogonal projection of each first electrode 3 onto the display panel 2 overlaps an orthogonal projection of the corresponding second electrode 4 onto the display panel 2. For example, the first electrodes 3 and the second electrodes 4 may be uniformly arranged at a touch region in an array form as the shaded boxes shown in FIG. 2.

A deformable layer 5 is arranged between the touch panel 1 and the display panel 2 and configured to be deformed in response to a pressure applied to the touch panel 1, so as to change a distance d between the first electrodes 3 and the second electrodes 4 and then change a capacitance of the pressure sensing capacitor. In some embodiments of the present disclosure, the pressure detection module may detect the capacitance change of the pressure sensing capacitor and determine a value of the pressure applied to the touch panel 1 based on the capacitance change.

It can be seen from the above embodiments, according to touch display device of the present disclosure in some embodiments of the present disclosure, the pressure electrodes are formed between the touch panel and the display panel, thereby avoiding the signal interference of the touch panel and the display panel. In addition, the pressure electrodes are within the cell, so an overall thickness of the touch display device may not be increased, which meets a development tendency of the ultrathin display device. In addition, the pressure electrodes at the side of the display panel may be directly formed on the glass substrate at the outermost side of the display panel, without arranging the plastic base material as in the related art, therefore the touch display device may have a larger transmittance and a forming process thereof may be simpler. In addition, because the strength of the glass substrate is larger than the plastic base material, the present disclosure may be particularly suitable for the touch display device having a large-size screen.

For example, in a practical application, the deformable layer in some embodiments of the present disclosure may be made of an insulative adhesive (e.g., solid-state optically clear adhesive OCA or oligomer curable resin OCR), and the touch panel is adhered to the display panel through the insulative adhesive. Because the adhesive is elastic, so it is able to be deformed in response to the pressure applied to the touch display device, and protect the touch display device as a buffer layer to protect the touch display device from being broken.

Figure 3:
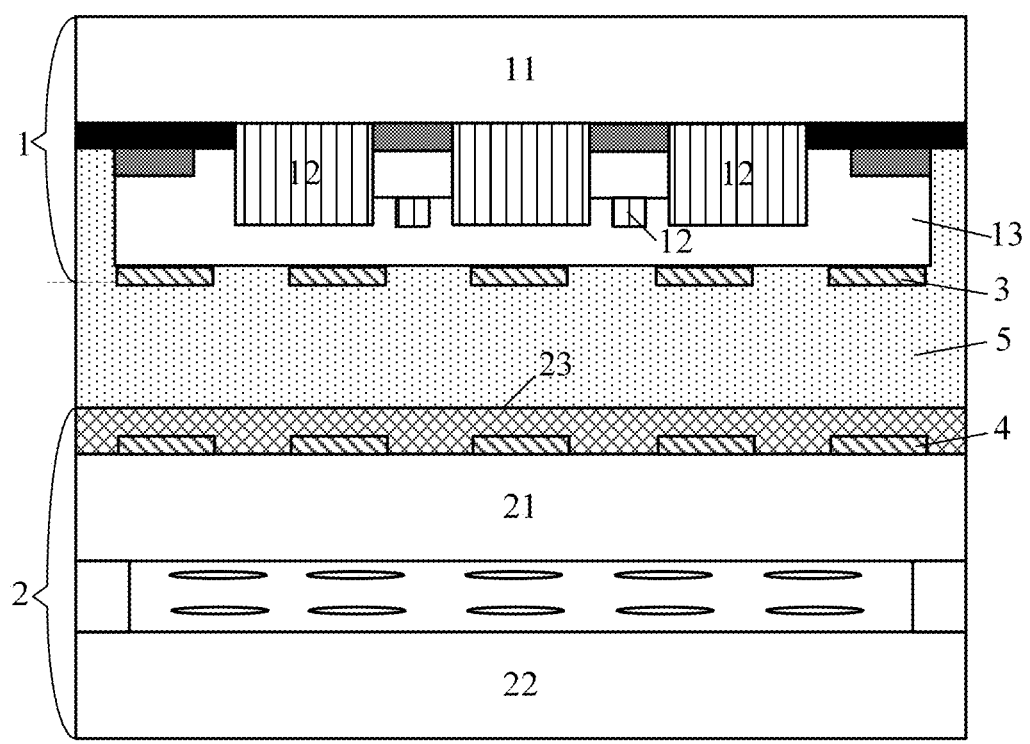
FIG. 3 is a schematic view of a touch display device in some embodiments of the present disclosure.

As shown in FIG. 3, the touch panel 1 in some embodiments of the present disclosure includes: a base substrate 11; touch electrodes 12 arranged on the base substrate 11; an insulation layer 13 covering the touch electrodes 12. The first electrodes 3 may be arranged on the insulation layer 13.

As shown in FIG. 3, the display panel 2 includes a color filter substrate 21 and an array substrate 22, and the second electrodes 4 are arranged at a side of the color filter substrate 21 away from the array substrate 22. Optionally, the color filter sheet 23 of the color filter substrate 21 may be formed after the second electrodes 4 are formed, that is, the color filter sheet 23 is arranged on the color filter substrate 21 and covers the second electrodes 4.

It can be seen that, in some embodiments of the present disclosure, the pressure sensing electrodes arranged in a one-to-one correspondence manner are formed respectively at the outer side of the color filter substrate 21 of the display panel 2 and on the surface of the insulation layer 13 of the touch panel 1 through an optical etching process, so as to form a capacitor sensor array. When the touch display device is deformed due to a pressure, a capacitance value of the capacitor sensor may be changed correspondingly, and then the pressure sensing may be achieved by identifying the capacitance change of the capacitor sensor. The solution of the present disclosure is compatible with the OGS touch technology in the related art, and because the capacitor sensor array is arranged below the touch panel, the touch signals may be shield effectively, so as to achieve an accurate pressure sensing.

In addition, a method for forming the above touch display device is further provided in some embodiments of the present disclosure, including: forming a touch panel and a display panel, where first electrodes are arranged at a side of the touch panel, and second electrodes are arranged at a side of the display panel. In some embodiments of the present disclosure, the method further includes: adhering the touch panel to the display panel through an insulative adhesive to form a cell, where the side of the touch panel where the first electrodes are arranged is adjacent to the side of the display panel where the second electrodes are arranged.

To be specific, the adhering the touch panel to the display panel through the insulative adhesive to form the cell includes: coating the insulative adhesive at the side of the touch panel where the first electrodes are arranged or the side of the display panel where the second electrodes are arranged; and adhering through the insulative adhesive a portion of the touch panel at the side of the touch panel where the first electrodes are arranged to a portion of the display panel at the side of the display panel where the second electrodes are arranged, to form the cell.

To be specific, in some embodiments of the present disclosure, the method further includes: processing the insulative adhesive through a vacuum defoamation process and/or a partially-curing process, subsequent to coating the insulative adhesive. The vacuum defoamation process is to make the adhesion of the adhesive more firm, and the partially-curing process is to increase the rigidity of the adhesive before forming the cell, so as to avoid the collapse and deformation of the adhesive during the cell forming process.

Obvious, the method for forming the above touch display device in some embodiments of the present disclosure is corresponding to the touch display device in some embodiments of the present disclosure, therefore the method may achieve the same technical effect as the touch display device.

The above are merely the some embodiments of the present disclosure. A person skilled in the art may make further modifications and improvements without departing from the principle of the present disclosure, and these modifications and improvements shall also fall within the scope of the present disclosure.

What is claimed is:

1. A touch display device, comprising a touch panel and a display panel arranged opposite to the touch panel to form a cell, wherein a deformable layer is arranged between the touch panel and the display panel and configured to be deformed in response to a pressure applied to the touch panel; and wherein:
   a plurality of first electrodes is arranged at a side of the touch panel adjacent to the display panel;
   a plurality of second electrodes is arranged at a side of the display panel adjacent to the touch panel;
   the first electrodes and the second electrodes are arranged in a one-to-one correspondence manner, and each second electrode and corresponding first electrode form a pressure sensing capacitor;
   the touch display device further comprises a pressure sensing module configured to detect a capacitance change of the pressure sensing capacitor and determine a value of the pressure applied to the touch panel based on the capacitance change; and
   orthogonal projections of the first electrodes onto the display panel coincide with orthogonal projections of the corresponding second electrodes onto the display panel;
   wherein the touch panel comprises:
      a base substrate;
      touch electrodes arranged on the base substrate;
      an insulation layer covering the touch electrodes; and
      the first electrodes on the insulation layer;
      wherein the first electrodes are between the touch electrodes and the display panel, and the first electrodes are on a surface of the insulation layer adjacent to the display panel.

2. The touch display device according to claim 1, wherein an orthogonal projection of each first electrode onto the display panel overlaps an orthogonal projection of a corresponding second electrode onto the display panel.

3. The touch display device according to claim 1, wherein the deformable layer is made of an insulative adhesive, and the touch panel is adhered to the display panel through the insulative adhesive.

4. The touch display device according to claim 3, wherein the insulative adhesive is a solid-state optically clear adhesive (OCA) or an oligomer curable resin (OCR).

5. The touch display device according to claim 1, wherein the display panel comprises a color filter substrate and an array substrate; and
   the second electrodes are arranged at a side of the color filter substrate away from the array substrate.

6. The touch display device according to claim 5, wherein a color filter sheet is arranged on the color filter substrate and covers the second electrodes.

7. The touch display device according to claim 5, wherein the second electrodes are in direct contact with a surface of the color filter substrate away from the array substrate.

8. The touch display device according to claim 1, wherein the first electrodes are uniformly arranged on a surface of the touch panel opposite to the display panel in an array form; and
   the second electrodes are uniformly arranged on a surface of the display panel opposite to the touch panel in an array form.

9. The touch display device according to claim 1, wherein an orthographic projection of the deformable layer onto the display panel overlaps with orthographic projections of the first electrodes and orthographic projections of the second electrodes onto the display panel.

10. A method for forming a touch display device, comprising: forming a touch panel and a display panel, wherein first electrodes are arranged at a side of the touch panel, and second electrodes are arranged at a side of the display panel, the first electrodes and the second electrodes are managed in a one-to-one correspondence manner;
   wherein the method further comprises:
   adhering the touch panel to the display panel through an insulative adhesive to form a cell, wherein the side of the touch panel where the first electrodes are arranged is adjacent to the side of the display panel where the second electrodes are arranged;
   wherein orthogonal projections of the first electrodes onto the display panel coincide with orthogonal projections of the corresponding second electrodes onto the display panel;
   wherein the adhering the touch panel to the display panel through the insulative adhesive to form the cell comprises:
      coating the insulative adhesive at the side of the touch panel where the first electrodes are arranged or the side of the display panel where the second electrodes are arranged; and
      adhering through the insulative adhesive a portion of the touch panel at the side of the touch panel where the first electrodes are arranged to a portion of the display panel at the side of the display panel where the second electrodes are arranged, to form the cell; and
   wherein the adhering the touch panel to the display panel through the insulative adhesive to form the cell further comprises: processing the insulative adhesive through a vacuum defoamation process and/or a partially-curing process, subsequent to coating the insulative adhesive.

* * * * *